United States Patent
Halme et al.

(10) Patent No.: US 7,967,248 B2
(45) Date of Patent: Jun. 28, 2011

(54) RIB ELEMENT AND COMPOSITE FLANGE FOR AIRCRAFT

(75) Inventors: Lauri Halme, Tampere (FI); Juha Halme, Tampere (FI)

(73) Assignee: Patria Aerostructures Oy, Halli (FI)

( * ) Notice: Subject to any disclaimer, the term of this patent is extended or adjusted under 35 U.S.C. 154(b) by 555 days.

(21) Appl. No.: 12/074,857

(22) Filed: Mar. 6, 2008

(65) Prior Publication Data

US 2008/0223987 A1 Sep. 18, 2008

(30) Foreign Application Priority Data

Mar. 12, 2007 (FI) .................................. 20075172

(51) Int. Cl.
*B64C 1/06* (2006.01)

(52) U.S. Cl. .................. 244/117 R; 244/123.1; 244/131

(58) Field of Classification Search .............. 244/117 R, 244/119, 132, 123.1, 123.4, 131
See application file for complete search history.

(56) References Cited

U.S. PATENT DOCUMENTS

| | | | | |
|---|---|---|---|---|
| 1,363,569 A | * | 12/1920 | Cook | 244/132 |
| 1,796,654 A | * | 3/1931 | Hermann | 244/123.1 |
| 2,140,558 A | * | 12/1938 | Schmidt | 244/132 |
| 2,397,447 A | * | 3/1946 | Tarbox | 244/123.12 |
| 2,427,853 A | * | 9/1947 | Goodlett | 244/123.2 |
| 2,567,124 A | * | 9/1951 | Roberts | 244/124 |
| 5,233,129 A | * | 8/1993 | Hall | 361/724 |
| 6,190,484 B1 | * | 2/2001 | Appa | 244/123.7 |
| 6,415,496 B1 | | 7/2002 | Dominguez Casado et al. | |
| 6,776,371 B2 | * | 8/2004 | Tanaka et al. | 244/117 R |
| 7,735,600 B2 | * | 6/2010 | Strunk et al. | 244/132 |

OTHER PUBLICATIONS

Swanson, Gary D., et al. "Structural Efficiency Study of Composite Wing Rib Structures." NASA Report NASA-CR-183004 (CCMS-88-18) (1988) 1, 68, s. 3, 5, 117, 119.

* cited by examiner

*Primary Examiner* — Galen Barefoot
(74) *Attorney, Agent, or Firm* — Ladas & Parry LLP

(57) ABSTRACT

A rib element for aircraft and a composite flange for use in aircraft. The rib element (24) and the composite flange (14), manufactured from a composite material, comprise at least two elongated flanges (15, 16, 26) interconnected with one another in a corner (17) provided with a rounded inner corner (18) and a rounded outer corner (19). The corner is reinforced by at least one reinforcing component (20) which covers at least a part of the inner corner.

11 Claims, 4 Drawing Sheets ns/length ratio should be ¹⁄₂₀. This means that, while taking

RIB ELEMENT AND COMPOSITE FLANGE FOR AIRCRAFT

BACKGROUND OF THE INVENTION

The invention relates to a rib element for use in support structures for wings, guide surfaces, and stabilizers of aircraft, the rib element being manufactured from a composite material and comprising flanges inter-connected with one another at rounded corners. The invention further relates to a composite flange for use in structures of aircraft, the composite flange comprising at least two interconnected flanges and a rounded corner between the flanges. The field of the invention is described in closer detail in the preambles of the independent claims.

A wing of aircraft, such as aeroplanes and the like, comprises skin plates, between which the actual support structure of the wing resides, the support structure typically comprising a front spar and a rear spar in the longitudinal direction of the wing and wing ribs provided in the transverse direction of the wing to connect the front and rear spars. Further, a plurality of stringers is usually provided between the wing ribs and the skin plates. The structure of stabilizers as well as of guide surfaces, such as spoilers, flaps, rudders, etc., is typically similar to that of a wing and comprises rib elements comparable with wing ribs.

In modern aircraft, more and more structural parts manufactured from a composite material are used instead of conventional components manufactured from metal parts that have been riveted together. The use of composite materials enables the weight of the structures to be reduced. It is also possible to manufacture various flange structures from a composite material wherein two or more flanges constitute an angle with respect to one another. A composite material is known to be stiff yet fragile, so to be on the safe side, every effort is made to dimension a corner of a flange structure such that it is extremely stiff. Consequently, the flanges are made quite thick, which results in a heavy flange structure. A known way to try and reduce the weight of a flange structure is to make the thickness of the flanges to be reduced over a distance starting from the corner, leaving the corner with a sufficient thickness of material. General design rules for composite structures, however, determine that a change in thickness should not take place discontinuously but a reduction in thickness is to take place gradually. Generally, the change in thickness/length ratio should be $\frac{1}{20}$. This means that, while taking the design rules into account, the relatively large thickness of the flanges required by the corner cannot be reduced sufficiently in order to make the structure lighter. The problem is thus that the current solutions do not enable a sufficiently strong and yet light flange structure to be produced, although such features are extremely important properties for aircraft components.

BRIEF DESCRIPTION OF THE INVENTION

An object of the present invention is to provide a novel and improved rib element for aircraft, and a composite flange for use in aircraft.

The rib element according to the invention, wherein at least one reinforcing component manufactured in a separate phase with respect to the rib element is attached to the rib element, and the reinforcing component is arranged in the corner between the flanges of the rib element and is arranged to cover at least a part of the inner corner, the reinforcing component being arranged to reinforce said corner.

The composite flange according to the invention, wherein at least one reinforcing component manufactured in a separate phase with respect to the composite flange is attached to the composite flange, and the reinforcing component is arranged to cover at least a part of the inner corner of the composite flange, the reinforcing component being arranged to reinforce the corner of the composite flange.

An idea underlying the invention is that a corner of a rib element or another flange structure manufactured from a composite material is reinforced by a reinforcing component attached to the area of an inner corner between two longitudinal flanges. The reinforcing component is arranged to cover the entire inner corner or at least a part thereof.

An advantage of the invention is that the flanges constituting a corner may be thinner since the reinforcing component makes the corner stronger. The strength of the corner no longer depends entirely on the thickness of the flanges. Any additional weight incurred by the reinforcing component is small compared to a reduction in weight achieved when being able to use thinner flanges. Furthermore, the properties, material, dimensions, and attachment of a separately manufactured reinforcing component may be selected in a versatile manner as necessary. Further, in terms of manufacturing techniques, such a reinforcing component is simple to attach to the flange structure compared, for instance, with creating reductions in thickness according to the design rules.

An idea of an embodiment is that the reinforcing component is made of a composite, comprising at least one polymeric binder and at least one reinforcing fiber. Such a reinforcing component has a particularly good strength/weight ratio.

An idea of an embodiment is that the reinforcing component is attached by an adhesive to a composite flange. In such a case, the reinforcing component is also capable of receiving shear forces to which the flange is subjected.

An idea of an embodiment is that a first flange comprises an attachment point, and that the reinforcing component is made to extend from the corner at least as far as to said attachment point. This enables the reinforcing component to easily receive loads to which the attachment point is subjected. Furthermore, the reinforcing component constitutes a thickening portion in the thin flange for the attachment point, which is advantageous particularly when the attachment point is provided with a hole through which an attachment bolt is arranged. It is also possible that the first flange is glued to a structure to be supported, in which case the entire outer surface of the first flange serves as an attachment point. In such a case, the reinforcing component may extend as far as to the outer edge of the first flange.

An idea of an embodiment is that the reinforcing component is an elongated plate having a longitudinal first edge and a longitudinal second edge. Furthermore, the second edge of the reinforcing component is curved and its radius of curvature substantially corresponds to that of an inner corner of a composite flange. The reinforcing component is attached to the first flange and arranged so that the second edge of the reinforcing component resides against the inner corner of the composite flange.

An idea of an embodiment is that the reinforcing component is an elongated curved piece wherein the radius of curvature of an outer surface of the component substantially corresponds with the radius of curvature of the inner corner of the composite flange. The outer surface of the curved reinforcing component is glued to the inner corner of the composite flange.

An idea of an embodiment is that the thickness of the reinforcing component equals or is less than the radius of curvature of the inner corner. On the basis of study conducted, it has been observed that even a surprisingly thin reinforcing component increases the strength of the corner significantly.

An idea of an embodiment is that the reinforcing component is made of metal, such as aluminum alloy or titanium.

An idea of an embodiment is that the reinforcing component comprises one or more holes to make it lighter.

An idea of an embodiment is that the rib element or the composite flange, i.e. the flange structure, comprises two or more reinforcing components arranged on top of one another and attached to the side of the inner surface of the flange structure. The superimposed reinforcing components may be equal in size or they may reduce in size in one or more directions, the more the farther away from the inner surface of the flange structure the reinforcing components reside.

An idea of an embodiment is that the size of the angle of the corner is between 75° and 105°.

An idea of an embodiment is that the rib element and the composite flange comprise at least one flange which comprises a section over which its thickness is arranged to be reduced as seen away from the corner. Such reduction in thickness may be implemented according to the normal design rules, e.g. with a ¹⁄₂₀ ratio. The structure then becomes particularly light as, on account of the reinforcing component, the flanges constituting the corner maybe thin and as the flanges have further been made thinner over a distance starting from the corner.

BRIEF DESCRIPTION OF THE DRAWINGS

Some embodiments of the invention are described in closer detail in the accompanying drawings, in which FIG. 1 schematically shows an aircraft wing whose support structure comprises a plurality of rib elements, FIG. 2 schematically shows an aircraft tail provided with stabilizers and guide surfaces whose support structure may comprise a plurality of rib elements.

For the sake of clarity, the figures show some embodiments of the invention in a simplified manner. In the figures, like reference numbers identify like elements.

DETAILED DESCRIPTION OF SOME EMBODIMENTS OF THE INVENTION

Figure 1:
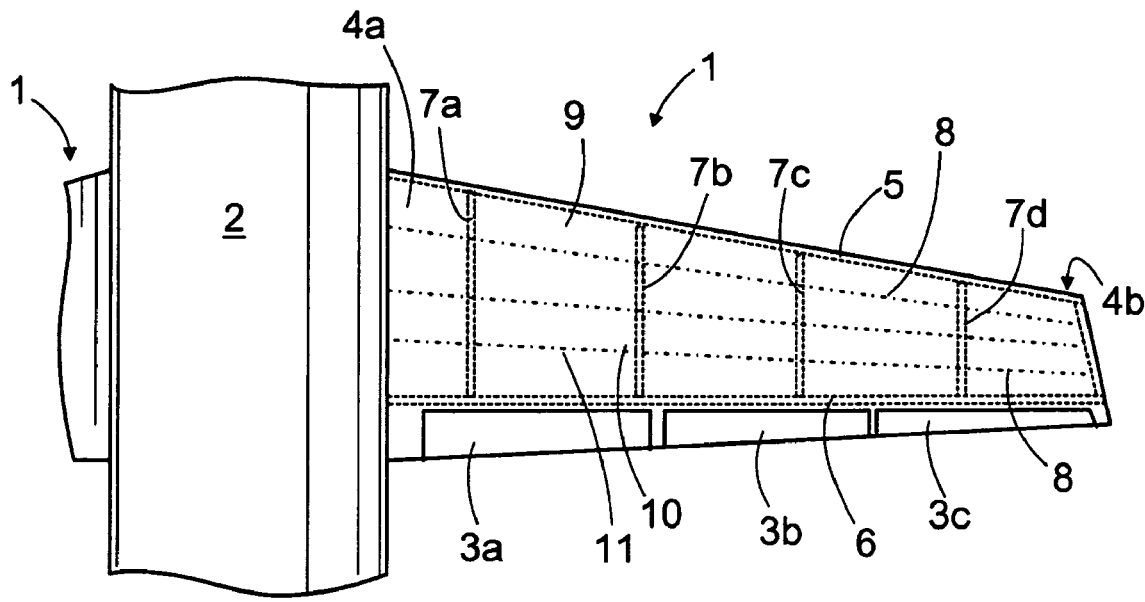

FIG. 1 shows a wing 1 attached to a fuselage 2 of an aircraft. A trailing edge of the wing 1 may be provided with movable guide surfaces 3a to 3c. The wing 1 may comprise an upper skin plate 4a and a lower skin plate 4b, a support structure of the wing being provided therebetween, which may comprise a front spar 5 and a rear spar 6 as well as a plurality of wing ribs 7 arranged between the spars. Thus, the front and the rear spars 5, 6 constitute stiffeners substantially in the longitudinal direction of the wing, whereas the wing ribs 7 constitute stiffeners in the transverse direction of the wing. The support structure may further comprise a plurality of stringers 8 which may be attached to an inner surface of the skin plates 4a and 4b and to the wing ribs 7. A wing rib 7 may be a rib element according to the invention.

Figure 2:
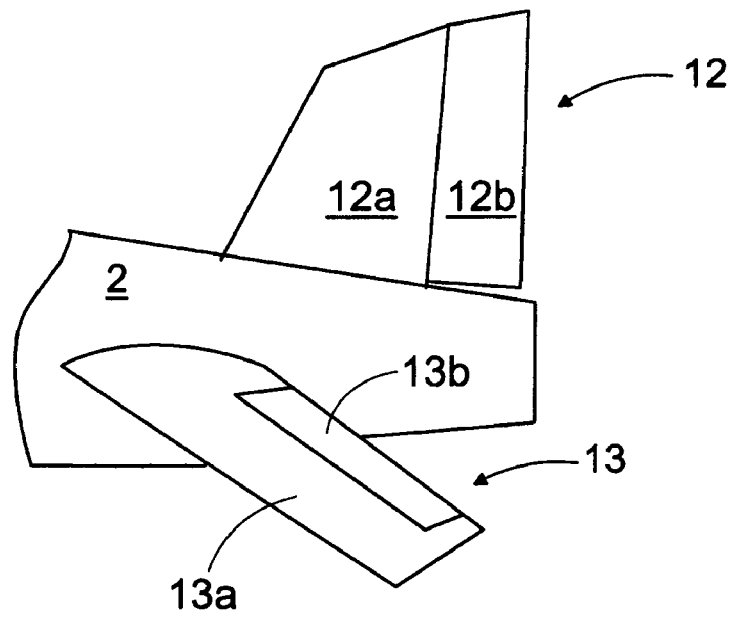

FIG. 2 shows an aircraft tail provided with fixed stabilizers 12a, 13a and movable guide surfaces 12b, 13b. The support structures of these stabilizers and guide surfaces may be provided with a rib element according to the invention.

Figure 3:
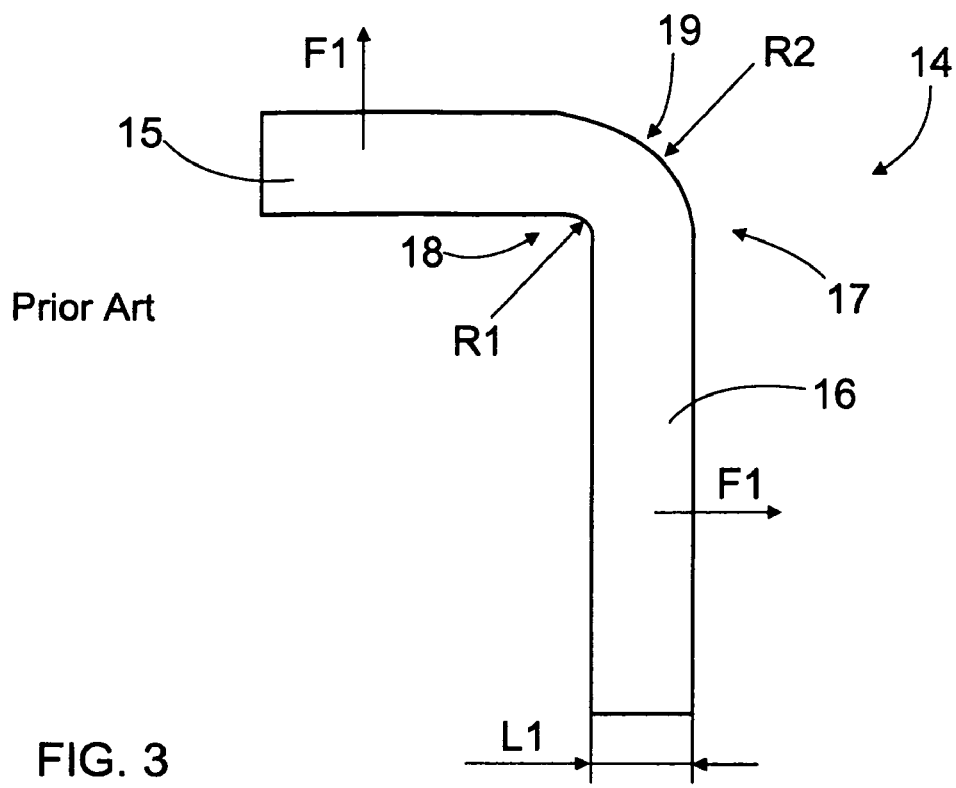
FIG. 3 is a schematic view showing, as seen from the longitudinal direction, a prior art flange wherein strength of a corner is ensured by making the flanges relatively thick.

FIG. 3 shows a typical composite flange 14 comprising a first flange 15 and a second flange 16 interconnected with one another such that they constitute a corner 17. Since the structure in question is a composite structure, the corner 17 is rounded. The corner 17 comprises an inner corner 18 and an outer corner 19. The radius of the inner corner 18 is R1 while the radius of the outer corner is R2. To be on the safe side, a thickness L1 of the flanges 15, 16 is usually made sufficiently large so that no risk of the corner 17 collapsing exists. Therefore, the weight of the composite flange is relatively large. Typically, the corner 17 is subjected to opening forces F1 which try to increase the angle of the corner 17.

Figure 4:
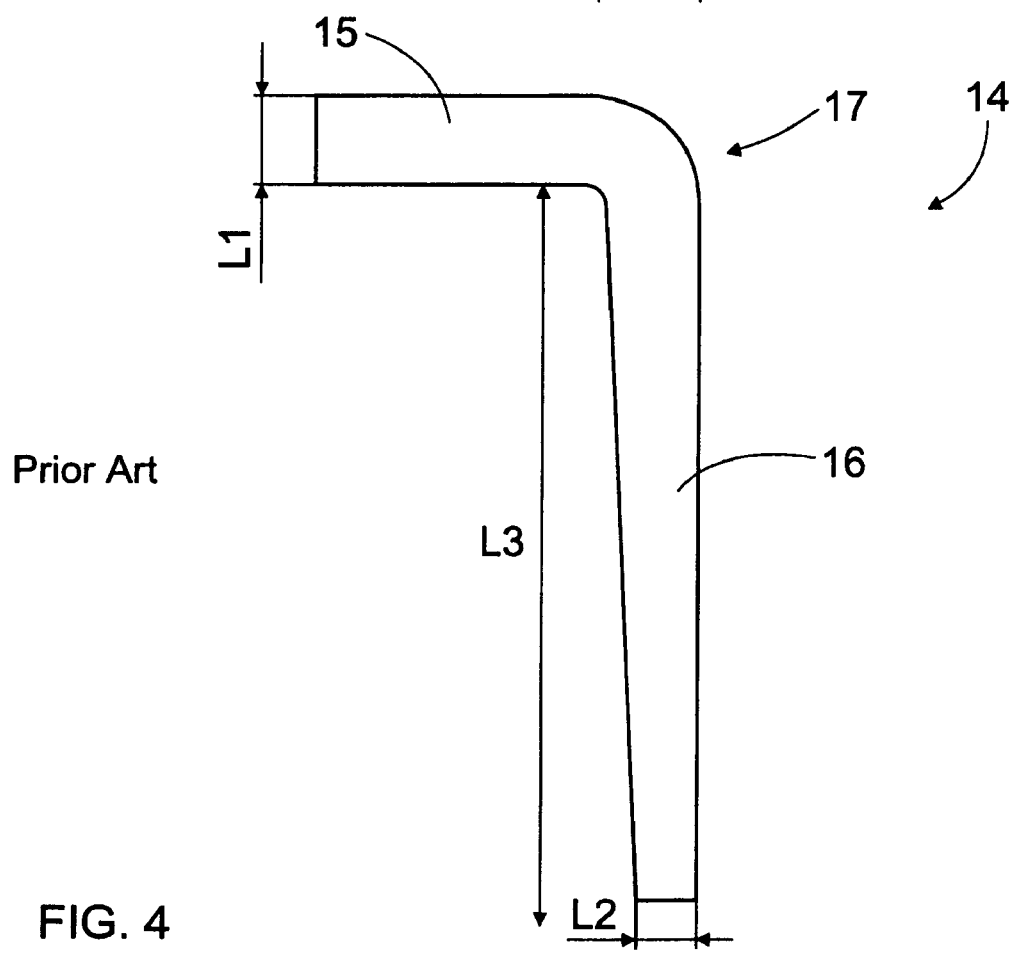
FIG. 4 is a schematic view showing, as seen from the longitudinal direction, another prior art flange wherein thickness of a vertical flange has been made to be reduced downwards, towards a free edge, in order to reduce weight.

FIG. 4 shows a composite flange 14 wherein an attempt has been made to make its vertical flange 16 lighter according to the design rules for composite structures by using a "ramp" for reducing the thickness. This means that the reduction in thickness from the thickness L1 to a thickness L2 may only take place at a ratio determined by the design rules to a distance L3. For instance, the ratio may be ¹⁄₂₀, in which case the thickness of the flanges may become reduced by 1 mm over a distance of 20 mm. Since the reduction in thickness has to take place carefully, it does not always have the desired effect on the weight of the structure. Within the region of the corner 17, however, the thickness L1 of the flanges 15, 16 has to be relatively large in order to ensure the strength of the corner 17.

Figure 5:
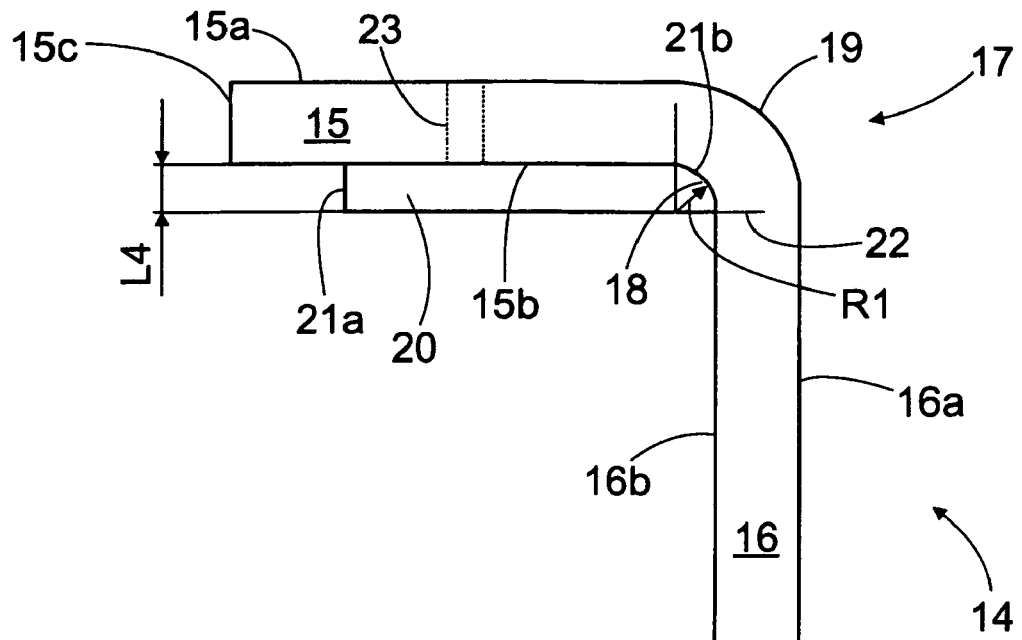
FIG. 5 is a schematic view showing, as seen from the longitudinal direction, a composite flange according to the invention.

FIG. 5 shows an application of the invention wherein the corner 17 of the composite flange 14 is reinforced and strengthened by means of a reinforcing component 20 attached against an inner surface 15b of the first flange 15. There may be one reinforcing component 20, or two or more reinforcing components 20 may be arranged on top of one another to constitute a laminate structure. The reinforcing component 20 may be an elongated plate-like piece having a longitudinal first edge 21a and a longitudinal second edge 21b. The second edge 21b may have a curved shape such that its radius of curvature substantially corresponds with the radius of curvature R1 of the inner corner 18 of the corner 17. The reinforcing component 20 is arranged such that the curved second edge 21b resides against the inner corner 18. A thickness L4 of the reinforcing component 20 may selected such that the second edge 21b covers the entire corner area 22 or, alternatively, at least a part thereof. Usually the thickness L4 of the reinforcing component 20 is smaller than a thickness L5 of the flanges 15, 16, but in some cases the situation may be the opposite. Further, the thickness L4 of the reinforcing component 20 may be selected such that it is larger than the corner area 22, in which case the second edge 21b of the reinforcing component 20 may also comprise a straight section over a distance, which extends over the corner area 22 and settles against an inner surface 16b of the second flange. In such a case, however, the weight of the reinforcing component 20 is clearly larger, which, the component being an aircraft component, is disadvantageous. The strength studies conducted surprisingly revealed that even a rather thin reinforcing component 20 is capable of supporting the corner 17 significantly. Consequently, the thickness L5 of the basic flanges 15, 16 may be clearly reduced and lighter. Further, the structure necessitates no use of ramp-like thinning sections, which are cumbersome as far as manufacturing techniques are concerned.

FIG. 5 further shows that the first flange 15 may be equipped with an attachment point 23 to which some other component belonging to the aircraft may be attached by glue, rivets, bolts or another appropriate means. The attachment point 23 may be provided with a hole for an attachment bolt. The reinforcing component 20 may extend from the corner 17 at least as far as to the attachment point 23, typically some distance over the attachment point 23 or even as far as to a free outer edge 15c of the first flange 15. The reinforcing component 20 may be glued against the inner surface 15b of the first flange, so it is capable of receiving shear stresses towards the attachment point in a plane direction. On account of the reinforcing component 20, the attachment point 23 is also thicker, which, of course, strengthens the walls of the attachment hole.

Figure 6:
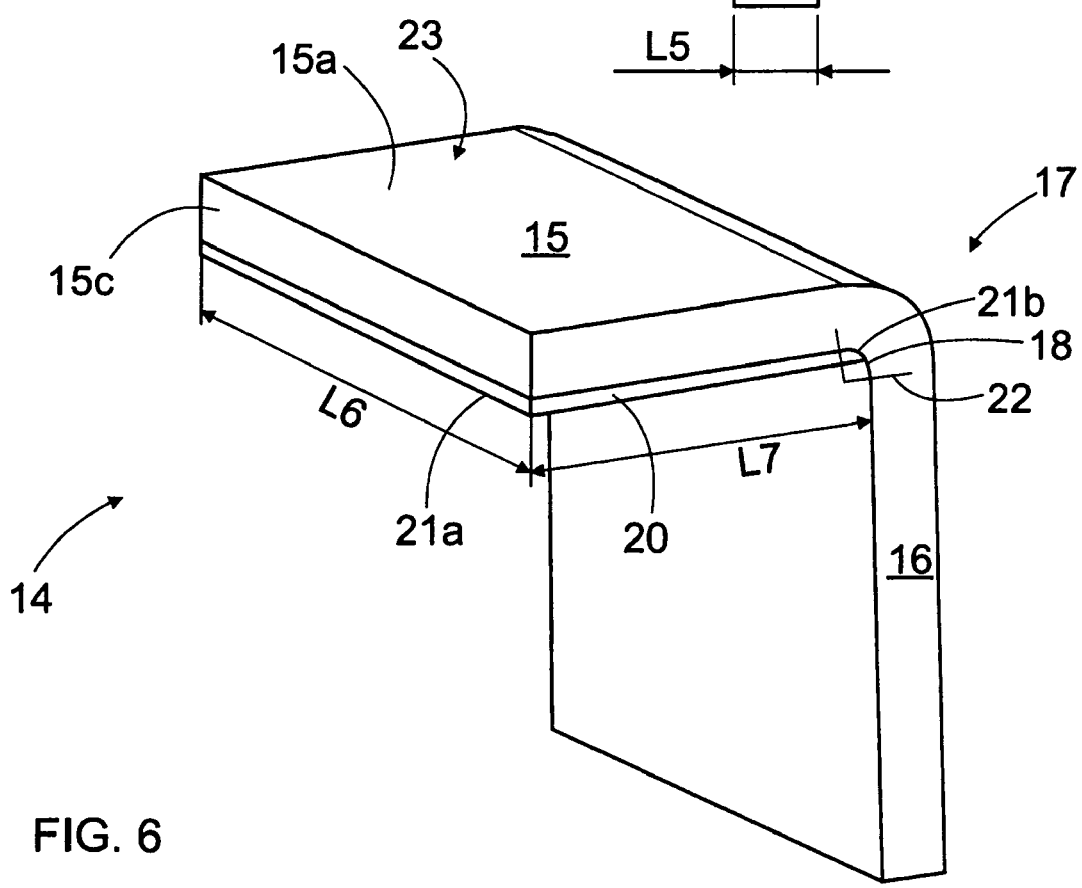
FIG. 6 is a schematic and perspective view showing another composite flange according to the invention.

In the solution shown in FIG. 6, the reinforcing component 20 is relatively thin, in which case its curved second edge 21b only covers a part of the corner area 22 of the inner corner 18. Further, the uniform portion of the entire upper surface 15b of the first flange 15 may serve as an attachment point 23, which may be attached by an adhesive to some other component of the aircraft. In such a case, the reinforcing component may in a width direction L7 extend as far as to the outer edge 15c of the first flange 15.

Figure 7:
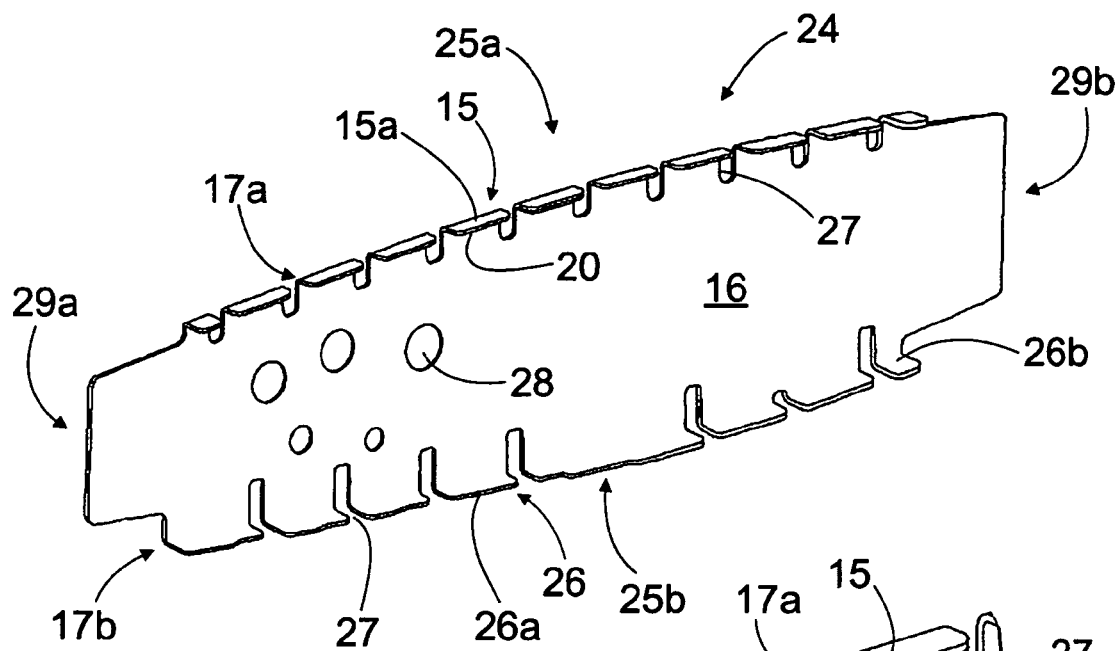
FIG. 7 is a schematic and perspective view showing a rib element according to the invention, FIG. 8 schematically shows a detail of a corner between a vertical flange and a horizontal flange of the rib element according to FIG. 7, and FIG. 9 schematically further shows a third composite flange and a reinforcing component provided at a corner according to the invention.

FIG. 7 shows an elongated rib element 24 provided with longitudinal curved sides 25a and 25b equipped with a first flange 15 and a third flange 26 whose outer surfaces 15a, 26a are arrangeable towards the skin plates of a wing, guide surface or stabilizer. A second flange 16 is provided between the flanges 15, 26, whereby a first corner 17a resides between the first flange 15 and the second flange while a second corner 17b resides between the third flange 26 and the second flange 16. In the case shown in FIG. 7, the first and the third flanges 15, 26 are substantially horizontal while the second flange 16 is substantially vertical. Of course, the angle of the corner 17a, 17b may also be other than a right angle, e.g. 75° to 105°. The longitudinal corners 17a, 17b comprise rounded inner corners and rounded outer corners. Further, the curved sides may be provided with notches 27 which may divide the flanges 15, 26 into two or more parts and also extend a distance into the vertical flange 16. An attachment member for a stringer, for example, may be arranged in these notches 27. The vertical flange 16 may further be provided with one or more openings 28 for pipes, wires or the like, and it may further be provided with a manhole for service and assembly. The rib element 24 is further provided with transverse ends 29a, 29b in the second flange 16, the ends being arrangeable towards the edge spars of a wing, guide surface or stabilizer. In the solution according to FIG. 7, reinforcing components 20 are only provided in the first corners 17a, but of course it is possible to arrange reinforcing components in the second corners 17b as well. Further, when necessary, different reinforcing components 20 may be used in different corners of the rib element 24. The features and properties disclosed in the description of the previous FIGS. 5 and 6 as well as of the following FIG. 9 may also be applied to the rib element 24.

Figure 8:
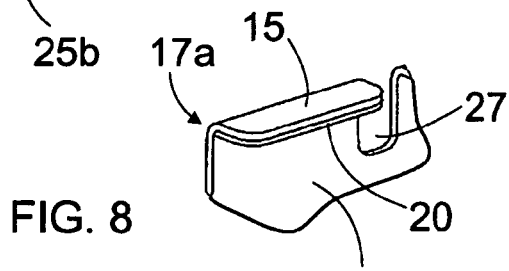

FIG. 8 shows a detail of a corner between the vertical flange and the horizontal flange of the rib element according to FIG. 7.

Figure 9:
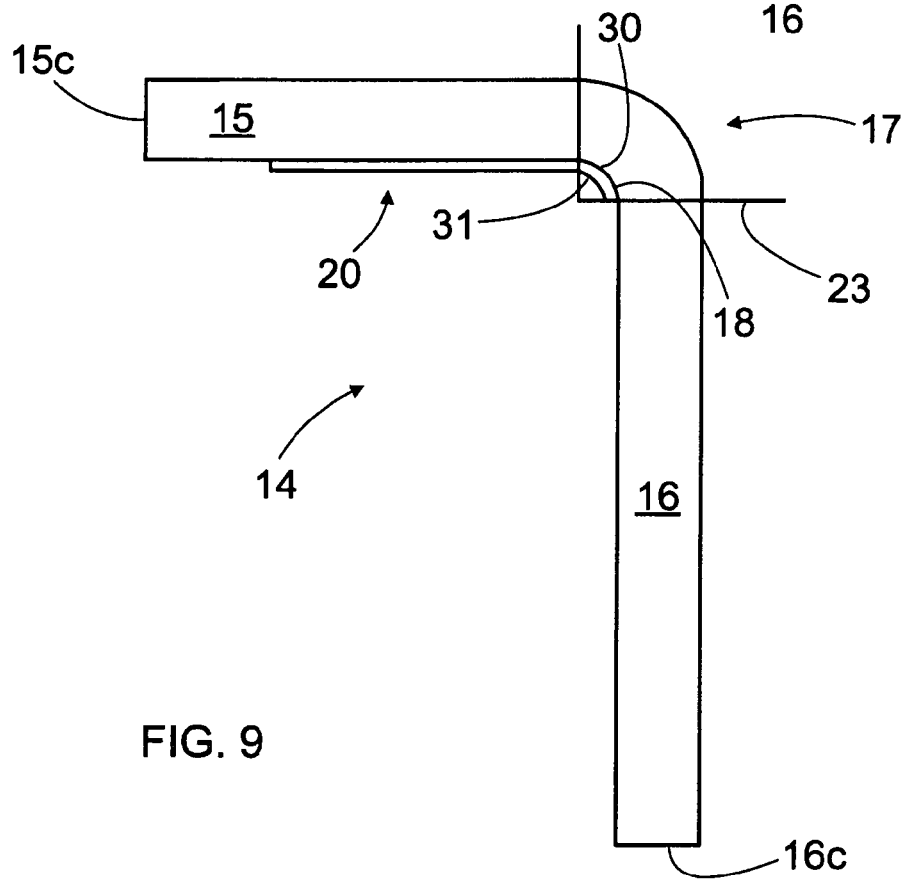

In FIG. 9, the corner 17 between the flanges 15, 16 is reinforced by attaching a longitudinal curved reinforcing component 20 to the corner 17 so that it covers, partly or completely, the corner area 23. The reinforcing component 20 comprises an outer surface 30 whose radius of curvature substantially corresponds with the radius of curvature R1 of the inner corner 18 of the composite flange. The outer surface 30 may be attached by glue to the inner corner 18 of the composite flange. The reinforcing component 20 may be a relatively thin structure, in which case its inner surface 31 may reside at the corner 17. Such a reinforcing component 20 may be made of a composite or it may be made e.g. of aluminum or titanium. Further, starting from the corner 17, the reinforcing component 20 may extend a distance towards the free edge 15c of the first flange 15 and, correspondingly, a distance towards the free edge 16c of the second flange 16.

The aforementioned reinforcing components may comprise one or more openings to lighten the structure of the reinforcing component.

It is to be generally noted that a composite structure may comprise a plurality of parallel reinforcing fibers. One or more such layers of reinforcing fibers may be provided. In different layers, the orientation of the reinforcing fibers may be the same or it may be different. Alternatively, the composite structure may comprise a netlike fiber reinforcement in one or more layers. A resin or another suitable plastic material, for instance, may serve as a binder. A fiber glass, carbon fiber, aramid fiber or the like, for example, may serve as a fiber reinforcement.

The composite parts, such as the composite flange, rib element and reinforcing components, may each be manufactured separately using e.g. Resin Transfer Molding. RTM method is suitable for manufacturing dimensionally accurate components. The reinforcements or reinforcement preforms are inserted in a mold and the mold is closed. Next, the mold may be injected with resin or a corresponding binder. Further, a Prepreg material, i.e. a pre-impregnated reinforcement, which may be hardened in an autoclave, may also be used.

In some cases, the features disclosed in the present application may be used as such, irrespective of other features. On the other hand, when necessary, the features disclosed in the present application may be combined so as to provide different combinations.

The drawings and the related description are only intended to illustrate the idea of the invention. The details of the invention may vary within the scope of the claims.

What is claimed is:

1. A rib element for aircraft, which is an elongated support component to be arranged in a space defined by skin plates and edge spars in a wing, guide surface or stabilizer of the aircraft and which comprises:
   a first flange and a third flange having outer surfaces which are arrangeable towards the skin plates of a wing, guide surface or stabilizer,
   a second flange connected to the first flange and the third flange at first and second corners and at predetermined angles, the first and second corners having rounded inner corners and rounded outer corners between the flanges, the second flange having transverse ends which are arrangeable towards the edge spars of a wing, guide surface or stabilizer,
   wherein the rib element is manufactured from a composite material and further comprises a reinforcing component attached to the rib element, the reinforcing component being manufactured in a separate phase with respect to the rib element and arranged in the first corner between the first and second flanges of the rib element to cover at least a part of the inner corner of the first corner and to reinforce the first corner, wherein the reinforcing component is an elongated plate-like piece provided with a first end and a second end, the second end of the reinforcing component is curved and has a radius of curvature substantially corresponding to a radius of curvature of the inner corner, the reinforcing component is attached to the first flange and arranged such that the curved second end of the reinforcing component resides and terminates against the inner corner of the first corner, and a thickness of the reinforcing component is smaller than the radius of curvature of the inner corner of the first corner.

2. A rib element as claimed in claim 1, wherein the first flange comprises at least one attachment point at a distance from the inner corner of the first corner, the reinforcing component is dimensioned such that the first end resides at a greater distance from the inner corner of the first corner than said attachment point, and the reinforcing component is attached by an adhesive against an inner surface of the first flange, the reinforcing component being arranged to receive shear forces to which the attachment point is subjected and to support the first corner.

3. A rib element as claimed in claim 1, wherein a thickness of the reinforcing component decreases toward the second end.

4. A rib element as claimed in claim 3, wherein the thickness of the reinforcing component decreases to form a curved surface which substantially follows the curvature of the inner corner of the composite structure.

5. An aircraft composite structure comprising:

a first flange for supporting a load thereon and a second flange, each having one free edge and being connected to each other at a corner at an angle, the corner having a rounded inner corner and a rounded outer corner between the flanges, and wherein the composite structure is manufactured at least mainly from at least one polymeric binder and at least one reinforcing fiber, and further comprises a reinforcing component manufactured in a separate phase with respect to the composite structure, the reinforcing component being attached to the composite structure, and arranged to cover at least a part of the inner corner of the composite structure and to reinforce the corner of the composite structure, wherein the reinforcing component is an elongated plate-like piece having a first end and a second end, the second end of the reinforcing component is curved and has a radius of curvature substantially corresponding to a radius of curvature of the inner corner of the composite structure, and the reinforcing component is attached to the first flange and arranged so that the second end of the reinforcing component resides and terminates against the inner corner of the composite structure.

6. A composite flange as claimed in claim 5, wherein the reinforcing component is made of a composite comprising at least one polymeric binder and at least one reinforcing fiber.

7. A composite flange as claimed in claim 5, wherein the reinforcing component is attached by an adhesive to the composite structure.

8. A composite flange as claimed in claim 5, wherein the first flange comprises at least one attachment point, and the reinforcing component is dimensioned to extend from the corner at least as far as to said attachment point.

9. A composite structure as claimed in claim 5, wherein a thickness of the reinforcing component decreases toward the second end.

10. A composite structure as claimed in claim 9, wherein the thickness of the reinforcing component decreases to form a curved surface which substantially follows the curvature of the inner corner of the composite structure.

11. An aircraft support structure made of a composite material, the support structuring comprising:

a first flange for supporting a load thereon, a second flange connected to the first flange at an angle forming a corner between the first and second flanges, a reinforcing component secured to the first flange, the reinforcing component extending from the first flange to the corner between the first and second flanges, wherein the reinforcing component has a curved end having a decreasing thickness, the curved end of the reinforcing component being shaped to follow a curvature of the corner between the first and second flanges.

* * * * *